US011271880B2

(12) United States Patent
Sisson et al.

(10) Patent No.: US 11,271,880 B2
(45) Date of Patent: Mar. 8, 2022

(54) ORCHESTRATED MESSAGE DELIVERY

(71) Applicant: Microsoft Technology Licensing, LLC, Redmond, WA (US)

(72) Inventors: Claire H. Sisson, Redmond, WA (US); Diego F. Martinez Diaz, Bellevue, WA (US); Venkat Pradeep Chilakamarri, Seattle, WA (US); Meera A. Kulkarni, Redmond, WA (US); FNU Om Krishna, Redmond, WA (US); Kiran Kumar Dowluru, Bellevue, WA (US); Philip Rueker, Redmond, WA (US); Vlad Riscutia, Redmond, WA (US); Harish Kasina, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 105 days.

(21) Appl. No.: 16/262,295

(22) Filed: Jan. 30, 2019

(65) Prior Publication Data
US 2020/0137009 A1 Apr. 30, 2020

Related U.S. Application Data

(60) Provisional application No. 62/752,969, filed on Oct. 30, 2018.

(51) Int. Cl.
*G06F 15/16* (2006.01)
*H04L 51/046* (2022.01)
*G06Q 30/02* (2012.01)
*H04L 51/226* (2022.01)

(52) U.S. Cl.
CPC ....... *H04L 51/046* (2013.01); *G06Q 30/0255* (2013.01); *H04L 51/26* (2013.01)

(58) Field of Classification Search
CPC ....... H04L 51/046; H04L 51/26; G06Q 30/02; G06Q 30/0255; G06Q 30/0242; G06Q 30/0271
See application file for complete search history.

(56) References Cited

U.S. PATENT DOCUMENTS

| 8,326,673 B1 | 12/2012 | Biere et al. |
| 9,691,082 B1 | 6/2017 | Burnett et al. |
| 2004/0044569 A1 | 3/2004 | Roberts et al. |

(Continued)

OTHER PUBLICATIONS

"International Search Report and Written Opinion Issued in PCT Application No. PCT/US19/052536", dated Nov. 14, 2019, 10 Pages.

(Continued)

*Primary Examiner* — Oleg Survillo
(74) *Attorney, Agent, or Firm* — Jacob P. Rohwer; Newport IP, LLC

(57) ABSTRACT

A current user lifecycle phase and a desired outcome for a user for a current user lifecycle phase are identified. Messages eligible to be shown to the user are identified based upon the current user lifecycle phase for the user. From the eligible messages, particular messages can be selected for delivery to the user based upon one or more governance rules, user attributes, user activity, seasonality, and/or the desired outcome for the current user lifecycle phase for the user. The selected messages can then be shown to the user. In this manner, relevant messages can be presented to the relevant users at a relevant time.

20 Claims, 6 Drawing Sheets

(56) References Cited

U.S. PATENT DOCUMENTS

| | | | |
|---|---|---|---|
| 2011/0307695 A1* | 12/2011 | Slater | G06F 21/604 |
| | | | 713/163 |
| 2014/0040017 A1 | 2/2014 | Bafna et al. | |
| 2016/0180399 A1 | 6/2016 | Lindo | |
| 2016/0379253 A1 | 12/2016 | Chan et al. | |
| 2017/0068993 A1 | 3/2017 | Kim | |
| 2017/0186035 A1* | 6/2017 | Levin | G06F 16/248 |
| 2017/0331777 A1* | 11/2017 | Brisebois | H04L 51/16 |
| 2018/0067754 A1 | 3/2018 | Riscutia et al. | |
| 2018/0219818 A1* | 8/2018 | Kramer | G06Q 30/0277 |
| 2020/0134675 A1 | 4/2020 | Sisson et al. | |

OTHER PUBLICATIONS

"International Search Report and Written Opinion Issued in PCT Application No. PCT/US2019/056415", dated Jan. 7, 2020, 10 Pages.

"Non Final Office Action Issued in U.S. Appl. No. 16/257,727", dated Mar. 3, 2021, 12 Pages.

Dhandhania, Vedant, "Machine Learning Predictions for Subscription Companies", Retrieved from: https://www.retentionscience.com/blog/machine-learning-subscription-companies/, Available on May 29, 2017, 9 Pages.

"Final Office Action Issued in U.S. Appl. No. 16/257,727", dated Aug. 23, 2021, 17 Pages.

* cited by examiner

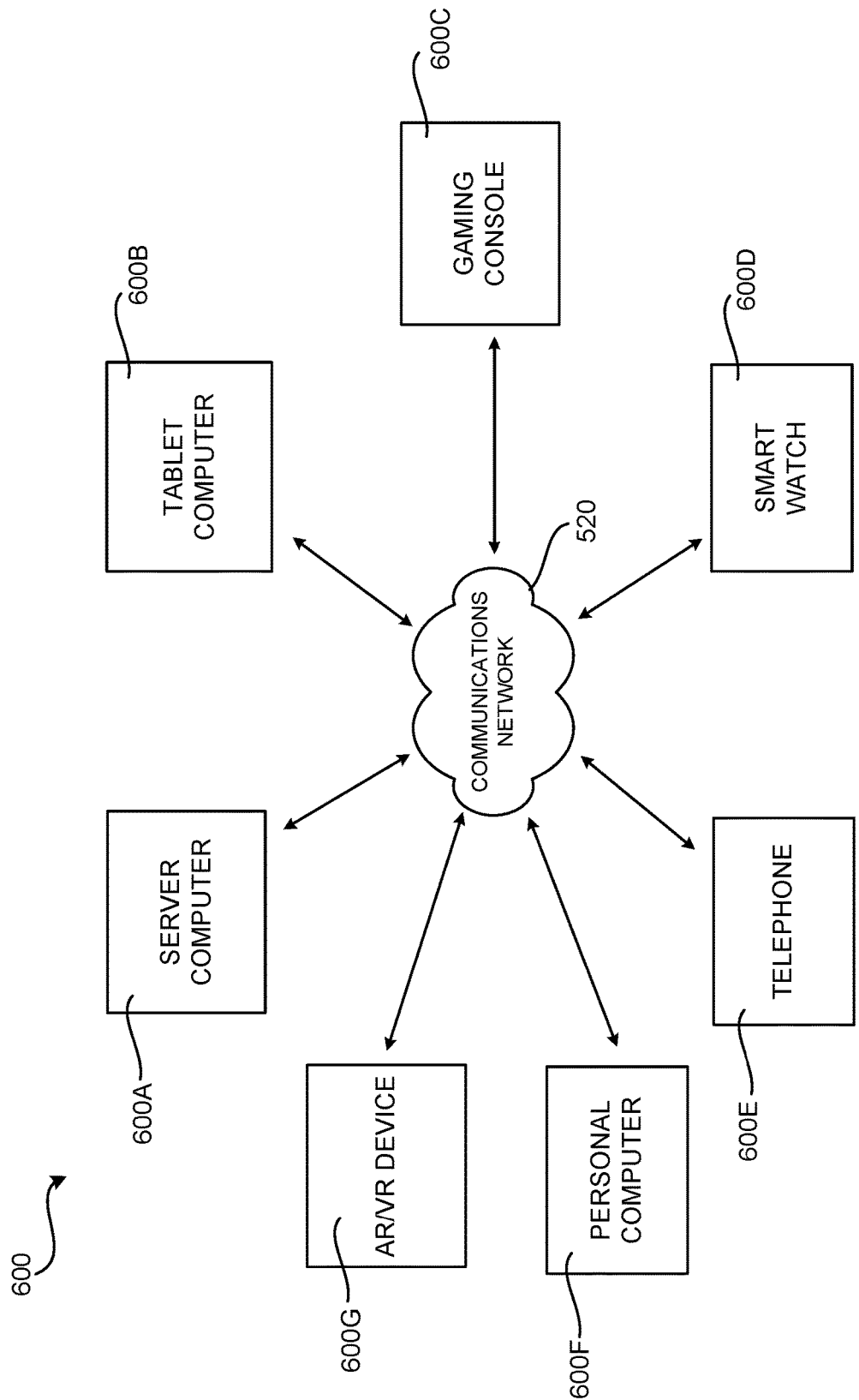

ORCHESTRATED MESSAGE DELIVERY

CROSS-REFERENCE TO RELATED APPLICATIONS

This application is related to and claims the benefit of U.S. Provisional Patent Application No. 62/752,969, entitled "Orchestrated Message Delivery," filed on Oct. 30, 2018, and which is expressly incorporated herein by reference in its entirety.

BACKGROUND

Many types of software are provided via a subscription license model, which is sometimes referred to as a "term license." For example, desktop and mobile application programs, web sites, and other types of software products can be provided to a user as long as the user maintains a subscription to the product. The user will be prohibited from using the software product if the user does not renew (i.e. cancels) their subscription to the product at the end of their subscription term (e.g. a month or a year).

Customer retention poses a significant challenge to providers of software via a subscription license model. Software providers commonly utilize many different mechanism in order to maximize the likelihood that customers will renew their subscriptions at the end of their subscription terms. One such mechanism involves regularly presenting messages to subscribers that convey information regarding aspects of the software. For instance, messages might be presented to subscribers that identify various features of the software Messages such as those described above are commonly provided to subscribers of subscription software using many different communication channels. For instance, applications and operating systems can present messages to subscribers via various and sometimes numerous in-application user interfaces. Messages can also be provided to subscribers via traditional communications channels, such as electronic mail messages. Communication channels such as those described above are, however, most suitable for presenting one-off messages to subscribers, and are not generally suited for having a coherent and efficient ongoing conversation with subscribers.

Other factors can also contribute to an excessive number of messages being provided to subscribers. For instance, one product group within a subscription provider's organization might transmit an email message to subscribers describing a particular feature of an application. Another product group within the same organization might cause a message regarding a different feature of the application to be presented to subscribers via an in-application messaging surface. As a result, subscribers can be bombarded with a large volume of messages, some or many of which might be irrelevant to the subscribers or might even be duplicative. For instance, subscribers might receive messages describing product features that they are not interested in or messages that duplicate content presented in previous messages.

Presenting too many or irrelevant messages to subscribers in the manner described above can result in customers having a negative experience with a subscription software product. As a result, these customers might be unlikely to renew their subscriptions to the software product at the end of their subscription terms.

Presenting too many or irrelevant messages to subscribers in the manner described above can also result in the utilization of computing resources unnecessarily. For example, the creation, storage, transmission, and presentation of irrelevant or excessive messages to subscribers can unnecessarily utilize processor cycles, memory, energy, mass storage, and network bandwidth. Unnecessary utilization of computing resources such as these can be significant, particularly where messages are provided to a large number of subscribers to a subscription software product.

It is with respect to these and other technical challenges that the disclosure made herein is presented.

SUMMARY

Technologies are disclosed herein for orchestrated presentation of messages based upon a desired outcome for a user lifecycle phase. Through implementations of the disclosed technologies, computing resources can be conserved by prioritizing presentation of messages to users such that messages that are most relevant to users' needs are shown to the users before other less relevant messages. In particular, processor cycles, memory, energy, mass storage, and network bandwidth might be conserved through implementations of the disclosed technologies by reducing the number of messages transmitted and displayed to users.

Presented messages that have been orchestrated in the disclosed manner can also enable users to achieve more with a software product by enabling focused feature discovery through more precise messaging. This can also reduce the annoyance caused to users by the presentation of excessive or irrelevant messages. Other technical benefits not specifically mentioned herein can also be realized through implementations of the disclosed subject matter.

In order to realize the technical benefits described above, and potentially others, a message orchestration system is disclosed for selecting messages to be presented to users. In particular, the message orchestration system identifies a current user lifecycle phase and a desired outcome for a user for their current user lifecycle phase. Each user lifecycle phase represents a period of time during a subscription term of a software product. For example, a user lifecycle phase might correspond to days 1-14 of a one year subscription to a software product. Another user lifecycle phase might correspond to days 15-60 of the one year subscription and yet another user lifecycle phase might correspond to days 61-356.

In order to select messages for presentation to a user, the message orchestration system also identifies a desired outcome for the user for the current user lifecycle phase. Desired outcomes for a particular user lifecycle phase might include, for example, a user renewing a subscription for an application, utilizing a particular feature of the application, or using a related network service such as, but not limited to, a network storage service capable of storing files created with or accessible by the application that presents the orchestrated messages.

Once a user's current user lifecycle phase and a desired outcome for the user's current lifecycle phase have been selected, the orchestration system can identify messages that are eligible to be shown to the user. For instance, in some configurations only those messages specifying the same user lifecycle phase as the current user lifecycle phase for the user are eligible to be presented to the user.

Once the orchestration system has identified the messages that are eligible to be shown to the user, the system can select eligible messages for presentation to the user. The messages to be shown to the user can be selected based upon the likelihood that presentation of the messages will advance the desired outcome for the current user lifecycle phase for the user. Messages can also be selected for delivery to the user based upon one or more governance rules, user attributes, user activity, seasonality, previous user interaction with the application prior to, during, or after viewing a previous message, or other factors.

Selected messages can then be transmitted to a user's computing device and presented to the user by an application executing on the computing device. The application can present the messages in an in-application programmable messaging surface or in another location. In this manner, relevant messages can be presented to relevant users at relevant times.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

It should also be appreciated that the technical benefits described above are merely illustrative and that other technical benefits not specifically mentioned herein might also be realized through implementations of the disclosed subject matter.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a network diagram illustrating a distributed computing environment in which aspects of the disclosed technologies can be implemented.

DETAILED DESCRIPTION

Figure 1:
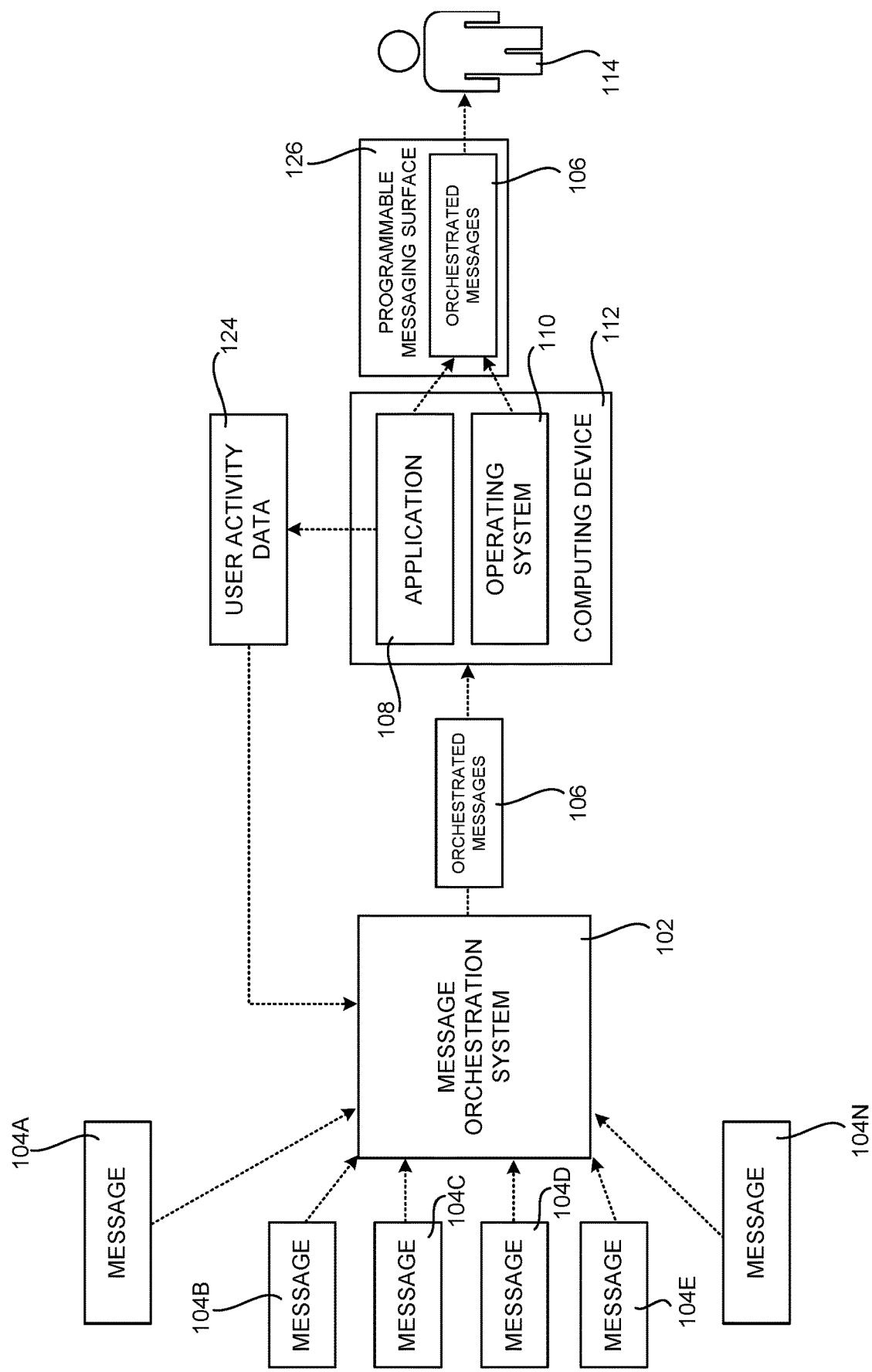
FIG. 1 is a computing architecture diagram that shows aspects of a message orchestration system capable of orchestrated presentation of messages based upon a desired outcome for a user lifecycle phase.

The following detailed description is directed to technologies for orchestrated presentation of messages based upon a desired outcome for a user lifecycle phase. As discussed briefly above, processor cycles, memory, energy, mass storage, and network bandwidth might be conserved through implementations of the disclosed technologies. In particular, computing resources can be conserved by prioritizing presentation of messages to users such that messages that are most relevant to users' needs are shown to the users before other less relevant messages. Presentation of less relevant messages might be postponed or these messages might not be shown at all. Other technical benefits not specifically mentioned herein can also be realized through implementations of the disclosed subject matter.

While the subject matter described herein is presented in the general context of a desktop or server computer, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., technologies for orchestrated presentation of messages based upon a desired outcome for a user lifecycle phase will be described.

FIG. 1 is a computing architecture diagram that shows aspects of a message orchestration system 102 capable of orchestrated presentation of messages 104 based upon a desired outcome for a user lifecycle phase. As illustrated in FIG. 1, the message orchestration system 102 can receive messages 104A-104N (which might be referred to herein collectively as the "messages 104" or individually as "a message 104") from a variety of sources. For example, different product or feature groups within an organization might submit messages 104 to the message orchestration system 102. As a result, there might be hundreds or even thousands of messages 104 that the different teams would like to send to the user 114. As discussed above, this quantity of messages can overwhelm or annoy users and also consume computing resources unnecessarily.

The messages 104 can include various types of content including, but not limited to, textual or graphical content directing a user 114 toward various features of an application 108 or instructing the user 114 on the use of a feature of the application 108. The messages 104 can include other types of content in other configurations.

As also illustrated in FIG. 1, the message orchestration system 102 can select messages (referred to herein as "orchestrated messages 106") for presentation to a user 114. The orchestrated messages 106 can then be provided to a computing device 112 for presentation to the user 114. Details regarding the process of selecting messages for presentation are provided below.

The orchestrated messages 106 can be presented to the user 114 through an appropriate user interface ("UI") provided by the application 108 or an operating system 110. For example, and without limitation, the application 108 can present the orchestrated messages 106 to the user in an in-application programmable messaging surface. An in-application programmable messaging surface is a portion of the UI provided by the application 108 that is reserved for presentation of messages 106 provided by the message orchestration system 102. Messages 106 can also be presented to the user 114 in other ways including, but not limited to, by way an electronic mail client application or through a voice-based user interface.

As will be described in greater detail below, the messages 104 can be orchestrated based upon a desired outcome for a current user lifecycle phase for the user 114. As discussed above, a user lifecycle phase represents a period of time during a subscription term of subscription to the application 108. For example, a user lifecycle phase might correspond to days 1-14 of a one year subscription to the application 108. Another user lifecycle phase might correspond to days 15-60 of the one year subscription and yet another user lifecycle phase might correspond to days 61-356. Details regarding a user lifecycle model defining various user lifecycle phases and corresponding desired outcomes will be described below with regard to FIG. 2.

The messages 104 can also be orchestrated based upon other factors including, but not limited to, user activity data 124 that describes user activity 114 with an application 108 prior to receiving a message 104, while viewing a message 104, and after viewing the message 104. The user activity data 124 can be collected on the computing device 112 with the user's 114 express consent and fed back into the message orchestration system 102 for use in improving the for selecting relevant messages 104 to be sent to the user 114 in the future. Message orchestration can be based on other factors, some of which are described below.

Figure 2:
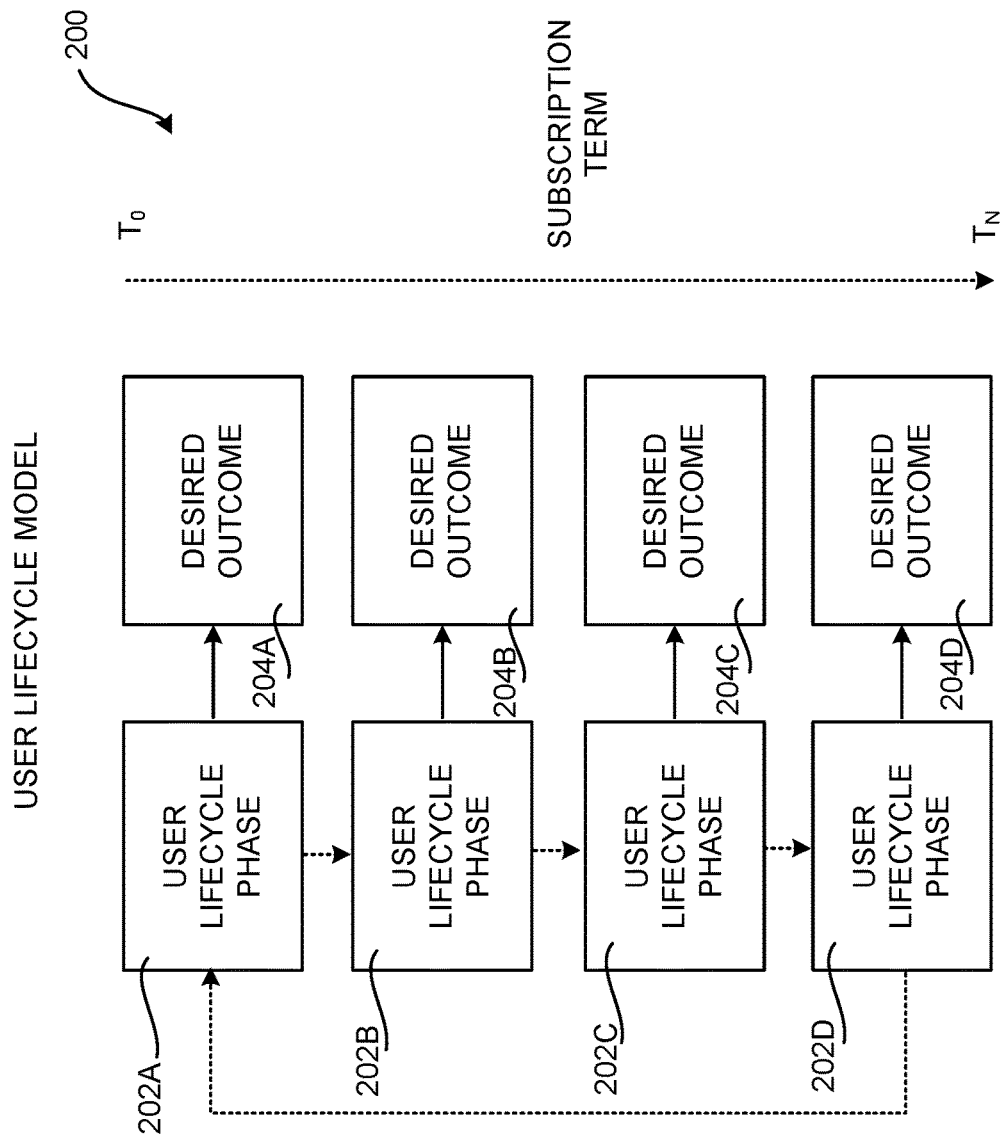
FIG. 2 shows aspects of a user lifecycle model utilized by the message orchestration system of FIG. 1 for orchestrated presentation of messages based upon a desired outcome for a user lifecycle phase.

FIG. 2 shows aspects of a user lifecycle model 200 utilized by the message orchestration system 102 of FIG. 1 for orchestrated presentation of messages 104 based upon a desired outcome for a user lifecycle phase. As shown in FIG. 2 and described briefly above, the user lifecycle model 200 divides the term of a subscription, such as a subscription to the application 108, into two or more user lifecycle phases 202. In the example shown in FIG. 2, for instance, the subscription term has been divided into four user lifecycle phases 202A-202D. The term of a subscription can be divided into a different number of user lifecycle phases 202 in other configurations.

Each user lifecycle phase 202 represents a period of time during a subscription term. In the example shown in FIG. 2, for instance, the user lifecycle phase 202A might correspond to days 1-14 of a one year subscription. The user lifecycle phase 202B might correspond to days 15-60 of the one year subscription, the user lifecycle phase 202C might correspond to days 61-351 of the one year subscription, and the user lifecycle phase 202D might correspond to days 352-365 of the one year subscription. After the last user lifecycle phase 202D in a user lifecycle model 200 has completed, the user lifecycle model 200 starts over by returning to the first user lifecycle phase 202A in the model. The user lifecycle phases 202 can be defined by data in a data structure referred to below as the user lifecycle phase definitions 316.

As illustrated in FIG. 2, a desired outcome 204 is also defined for each user lifecycle phase 202. A desired outcome 204 defines a desired action, or actions, for a user 114 to take before the end of each user lifecycle phase 202. For example, a desired outcome 204 for a user lifecycle phase 202 might be that a user begin using a storage service to store files created with or accessible by the application 108. As another example, the desired outcome for the final user lifecycle phase 202D in the user lifecycle model 200 might be that a user renews their subscription to the application 108 for another subscription term. The desired outcomes 204 for the user lifecycle phases 202 can change over time. Data describing the desired outcomes 204 for the user lifecycle phases 202 can be stored in a data structure referred to below as the desired outcome definitions 318.

Figure 3:
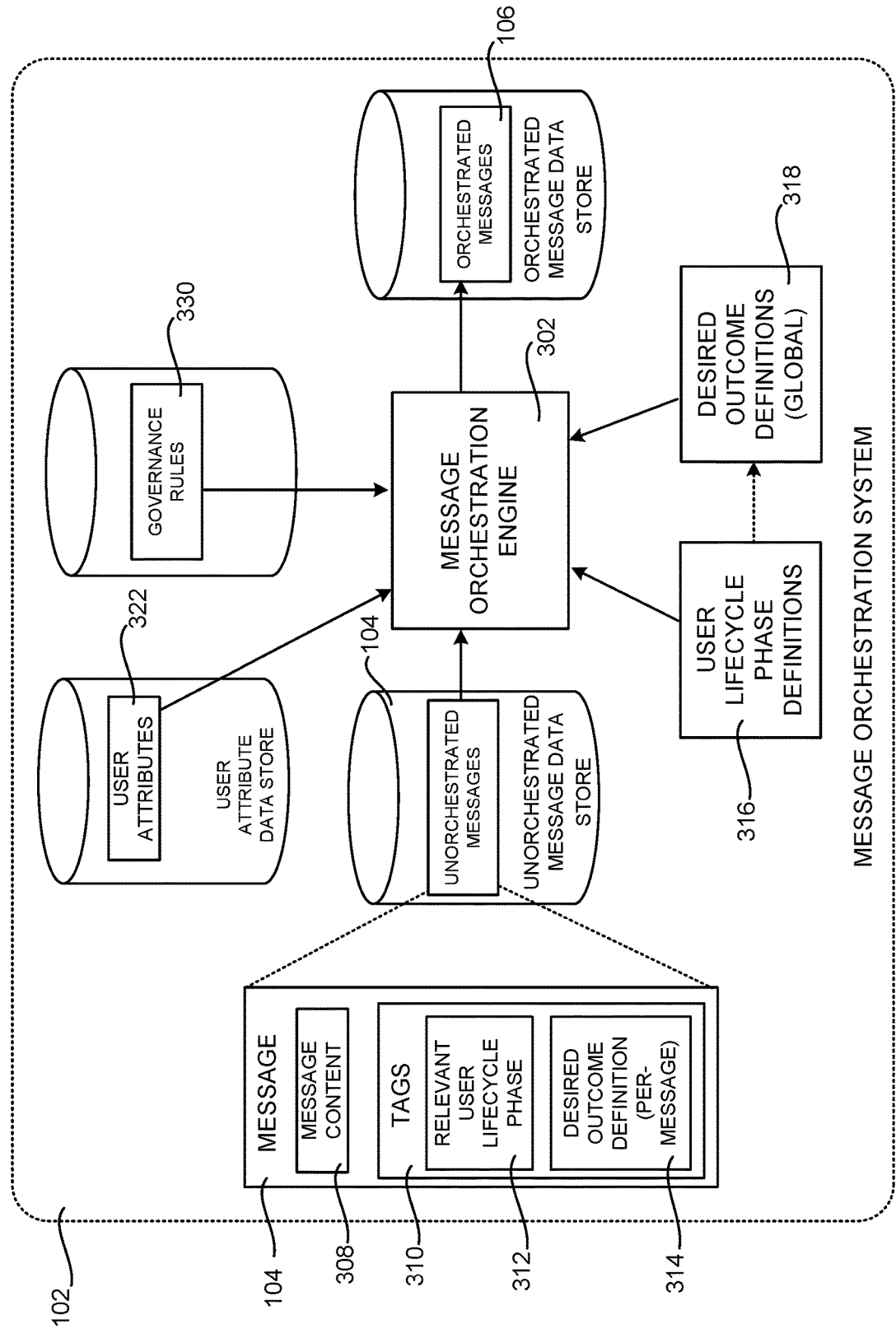
FIG. 3 is a computing architecture diagram that shows additional aspects of the configuration and operation of the message orchestration system shown in FIG. 1.

FIG. 3 is a computing architecture diagram that shows additional aspects of the configuration and operation of the message orchestration system 102 shown in FIG. 1. As shown in FIG. 3, the message orchestration system 102 includes a message orchestration engine 302. The message orchestration engine 302 is a software or hardware component that receives messages 104 and orchestrates the delivery of some or all of the messages 104 to a particular user 114.

The message orchestration engine 302 can select particular messages 106 for presentation to a particular user 114 at a particular time based, at least in part, upon the desired outcome for a particular user 114 for the user lifecycle phase 202 that the user 114 is currently in. As discussed above, the message orchestration engine 302 can also select messages 106 for presentation to a particular user at a particular time based upon based upon one or more governance rules (described below), user attributes, user activity, seasonality, and/or other factors. Messages 104 that have not been selected for presentation to the user 114 at a particular time might be shown to the user 114 later or might not be shown to the user 114 at all.

In order to provide the functionality described above, messages 104 can be submitted to the message orchestration system 102 from a variety of sources. The messages 104 include the message content 308 that is to be presented to users 114. The messages 104 also include data defining a user lifecycle phase 312 that the message is associated with. Messages 104 eligible to be transmitted to each user 114 can be identified by comparing the user lifecycle phase 312 specified by the messages 104 to the current user lifecycle phase 312 for each user 114. Only messages 104 having a matching user lifecycle phase 312 might be transmitted to users 114 currently in the same user lifecycle phase.

As shown in FIG. 3, the messages 104 can also specify a per-message desired outcome definition 314. The per-message desired outcome definition 314 defines a desired action, or actions, for a user to take in response to receiving a particular message. For instance, a message 104 might provide information to a user 114 about a particular feature of the application 108. The per-message desired outcome for that message 104 might be that the user access or utilize the feature. Other types of per-message desired outcomes can be specified.

In order to identify which, if any, of the messages 104 that are to be presented to a particular user 114, the message orchestration engine 302 might first determine the current user lifecycle phase 202 for the user (i.e. the user lifecycle phase 202 that the user 114 is currently in). The current user lifecycle phase 202 for the user 114 might be stored as user attributes 322 in an appropriate data store.

The user attributes 322 can also include other information about a user 114 such as, but not limited to, information describing a user's interests, data describing a user's utilization of the application 108, data describing a user's utilization of previous versions of the application 108, and/or other types of information. As mentioned above, this information is collected from the user 114 with their express consent.

The message orchestration engine 302 also identifies the corresponding desired outcome 204 for the current user lifecycle phase 202. The message orchestration engine 302 can then identify the messages 104 that are eligible to be shown to the particular user 114 by comparing the relevant user lifecycle phase 312 of the messages 104 to the current user lifecycle phase 202 of the user 114. As discussed above, only messages 104 specifying a relevant user lifecycle phase 312 that is the same as the user's current lifecycle phase 202 might be considered eligible for presentation to the user 114.

The message orchestration engine 302 can then select one or more of the messages 104 that are eligible to be shown to the particular user 114 at the particular time. The selection of the messages can be made based on some or all of the data described above, including the desired outcome of the current user lifecycle phase 202 of the user 114. Messages 104 that are more likely to advance the desired outcome of the current user lifecycle phase 202 are more likely to be presented to the user. Messages 104 that are less likely to advance the desired outcome of the current user lifecycle phase 202 of the user 114 are less likely to be presented to the user.

The message, or messages, to be shown to the user 114 (i.e. the orchestrated messages 106) are then presented to the user 114 in the manner described above. As also discussed above, messages 104 having a lower priority (e.g. messages 104 not directly relevant to successfully accomplishing the desired outcome for the user's current lifecycle phase) might be provided to the user 114 at a later time or not provided to the user 114 at all. In this manner, presentation of the messages 104 is tailored to each user 114. As a result, messages 104 that are irrelevant to a user's interests or particular use of the application 108 are not transmitted to the user, thereby reducing the number of messages transmitted to the user and conserving computing resources.

In some configurations, the messages 104 that have a higher probability of causing a specific desired outcome can be identified through experimentation over time. For example, messages 104 might be orchestrated in a particular order and transmitted to a user 114. A determination might then be made as to whether the messages 104 resulted in the desired outcome. This process can then be repeated using messages orchestrated in a different order until the system converges on a personalized model for each user 104.

As shown in FIG. 3, the message orchestration engine 302 can also utilize governance rules 330 in the selection of messages 104 to be shown to a particular user 114. The governance rules 330 can be defined by a user or machine-generated (e.g. by using machine learning techniques). The governance rules 330 define rules that can be applied to the messages 104 to determine those messages that are eligible to be presented to a particular user 114 at a particular point in time. For example, a governance rule 330 might specify that only messages 104 having content 308 relating to Halloween are to be presented to a user 114 during the month of October. Messages not having content 308 relating to Halloween will, therefore, not be eligible for presentation during that time period. Governance rules 330 based upon factors other than seasonality can also be defined. The governance rules 330 can also be updated based upon the user activity data 124 collected from a user 114 (e.g. data describing that actions that a user 114 took before receiving a message, while viewing a message, and after viewing a message).

Figure 4:
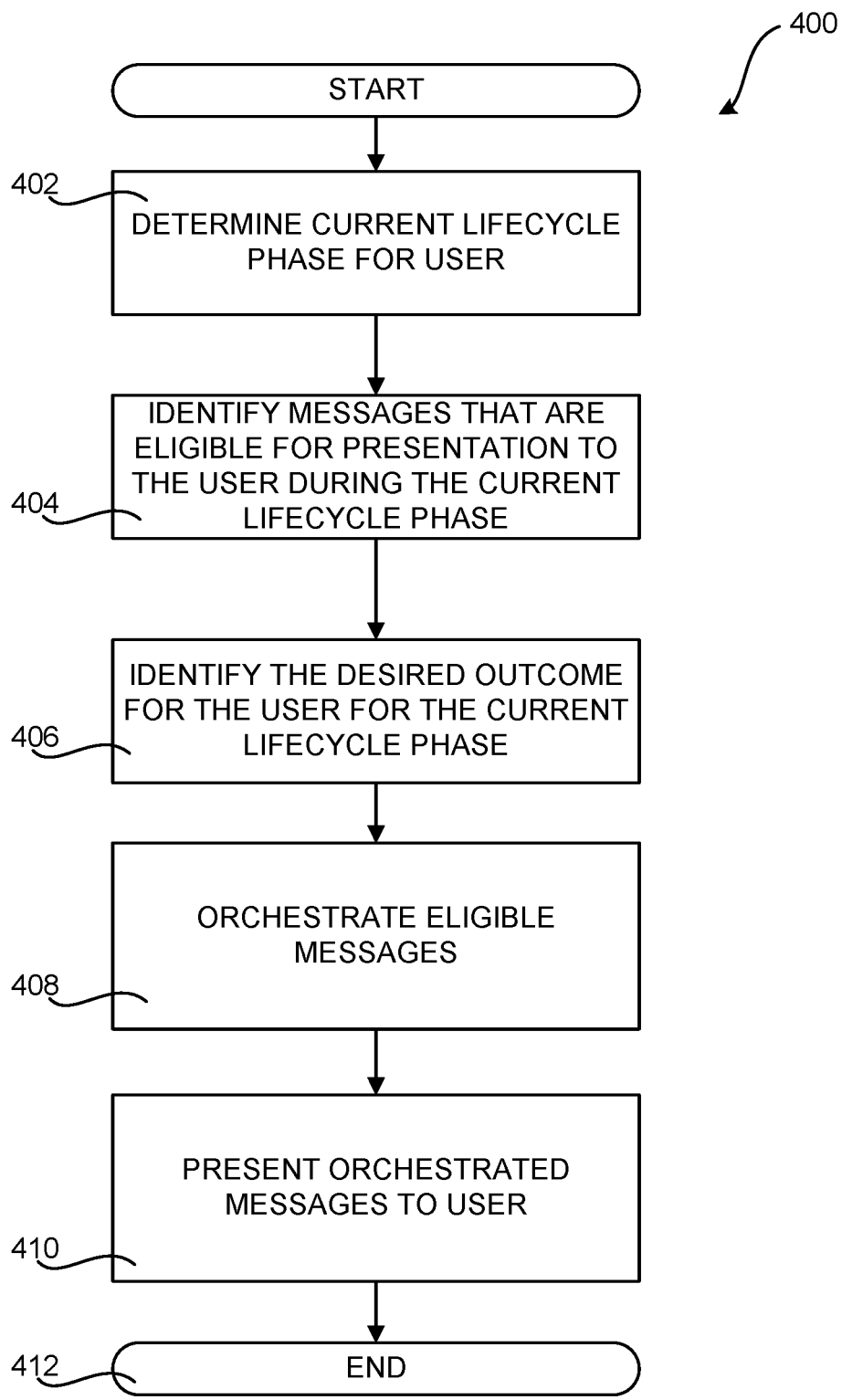
FIG. 4 is a flow diagram showing a routine that illustrates aspects of the operation of the message orchestration system described with reference to FIGS. 1-3.

FIG. 4 is a flow diagram showing a routine 400 that illustrates aspects of the operation of the message orchestration system 102 described with reference to FIGS. 1-3, according to one particular configuration. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where the message orchestration engine 302 determines the current user lifecycle phase 202 for a user (i.e. the user lifecycle phase 202 that the user 114 is currently in). As discussed above, the current user lifecycle phase 202 might be specified by the user attributes 322.

From operation 402, the routine 400 proceeds to operation 404, where the message orchestration engine 302 identifies the messages 104 that are eligible to be shown to the particular user 114 by comparing the user lifecycle phase 312 associated with the messages 104 to the current user lifecycle phase 202 for the user 114. As discussed above, only messages 104 specifying a user lifecycle phase 312 that is the same as the user's current lifecycle phase 202 are eligible for presentation to the user 114.

From operation 404, the routine 400 proceeds to operation 406, where the message orchestration engine 302 identifies the desired outcome 204 for the current user lifecycle phase 202. The routine 400 then proceeds to operation 408, where the message orchestration engine 302 selects messages from the eligible messages for presentation to a particular user at a particular time.

As discussed above, messages can be selected based, at least in part, upon the likelihood of the messages to advance the desired outcome of the current user lifecycle phase 202 of the user 114. In particular, messages 104 that are more likely to advance the desired outcome of the current user lifecycle phase 202 of the user 114 may be given higher priority for presentation. Messages 104 that are less likely to advance the desired outcome of the current user lifecycle phase 202 of the user 114 may be given a lower priority or excluded from consideration at the particular point in time.

From operation 408, the routine 400 proceeds to operation 410, where the messages 104 eligible to be shown to the user 114 (i.e. the orchestrated messages 106) are then presented to the user 114 in the manner described above. In this manner, presentation of the messages 104 is tailored to each user 114 and, as a result, users 114 are less likely to receive messages 104 that are irrelevant to their interests or particular use of the application 108. The routine 400 then proceeds from operation 410 to operation 412, where it ends.

Figure 5:
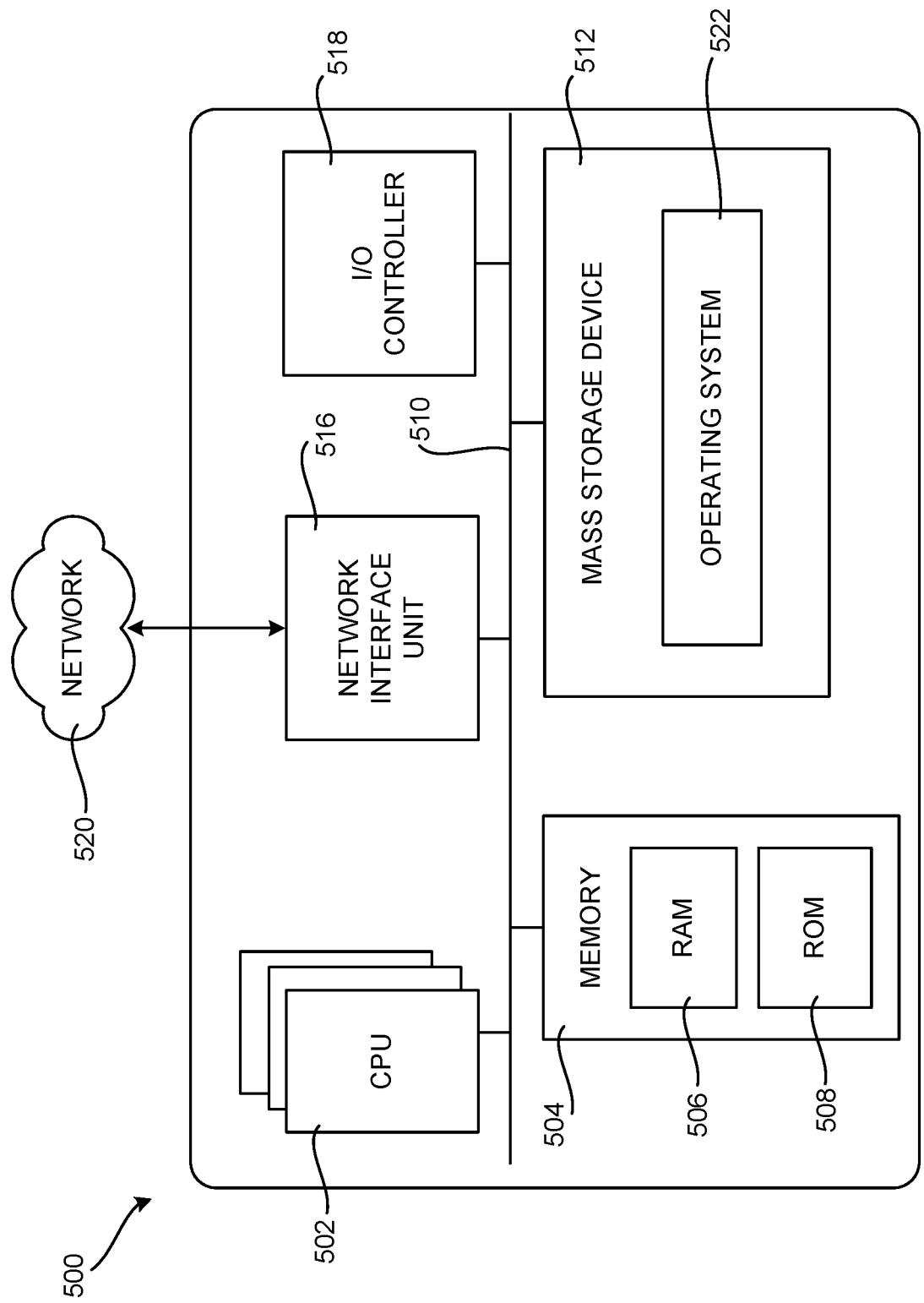
FIG. 5 is a computer architecture diagram showing an illustrative computer hardware and software architecture for a computing device that can implement aspects of the technologies presented herein.

FIG. 5 is a computer architecture diagram showing an illustrative computer hardware and software architecture for a computing device that can implement the various technologies presented herein. In particular, the architecture illustrated in FIG. 5 can be utilized to implement a server computer, mobile phone, an e-reader, a smartphone, a desktop computer, an AR/VR device, a tablet computer, a laptop computer, or another type of computing device.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, can be stored in the ROM 508. The computer 500 further includes a mass storage device 512 for storing an operating system 522, application programs, and other types of programs. The mass storage device 512 can also be configured to store other types of programs and data.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 520. The computer 500 can connect to the network 520 through a network interface unit 516 connected to the bus 510. It should be appreciated that the network interface unit 516 can also be utilized to connect to other types of networks and remote computer systems. The computer 500 can also include an input/output controller 518 for receiving and processing input from a number of other devices, including a keyboard, mouse, touch input, an electronic stylus (not shown in FIG. 5), or a physical sensor such as a video camera. Similarly, the input/output controller 518 can provide output to a display screen or other type of output device (also not shown in FIG. 5).

It should be appreciated that the software components described herein, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

FIG. 6 is a network diagram illustrating a distributed network computing environment 600 in which aspects of the disclosed technologies can be implemented, according to various embodiments presented herein. As shown in FIG. 6, one or more server computers 600A can be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 600B, a gaming console 600C, a smart watch 600D, a telephone 600E, such as a smartphone, a personal computer 600F, and an AR/VR device 600G.

In a network environment in which the communications network 520 is the Internet, for example, the server computer 600A can be a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP"). Additionally, the networked computing environment 600 can utilize various data security protocols such as secured socket layer ("SSL") or pretty good privacy ("PGP"). Each of the client computing devices 600B-600G can be equipped with an operating system operable to support one or more computing applications or terminal sessions such as a web browser (not shown in FIG. 6), or other graphical user interface (not shown in FIG. 6), or a mobile desktop environment (not shown in FIG. 6) to gain access to the server computer 600A.

The server computer 600A can be communicatively coupled to other computing environments (not shown in FIG. 6) and receive data regarding a participating user's interactions/resource network. In an illustrative operation, a user (not shown in FIG. 6) may interact with a computing application running on a client computing device 600B-600G to obtain desired data and/or perform other computing applications.

The data and/or computing applications may be stored on the server 600A, or servers 600A, and communicated to cooperating users through the client computing devices 600B-600G over an exemplary communications network 520. A participating user (not shown in FIG. 6) may request access to specific data and applications housed in whole or in part on the server computer 5800A. These data may be communicated between the client computing devices 600B-600G and the server computer 600A for processing and storage.

The server computer 600A can host computing applications, processes and applets for the generation, authentication, encryption, and communication of data and applications, and may cooperate with other server computing environments (not shown in FIG. 6), third party service providers (not shown in FIG. 6), network attached storage ("NAS") and storage area networks ("SAN") to realize application/data transactions.

It should be appreciated that the computing architecture shown in FIG. 5 and the distributed network computing environment shown in FIG. 6 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: identifying a current user lifecycle phase of a user lifecycle model for a user; identifying a desired outcome for the user for the current user lifecycle phase; identifying a plurality of messages eligible to be shown to the user based upon the current user lifecycle phase for the user; selecting messages from the plurality of messages eligible to be shown to the user based on a likelihood that presentation of the messages will advance the desired outcome for the current user lifecycle phase for the user; and causing an application to present the selected messages to the user.

Clause 2. The computer-implemented method of clause 1, wherein the plurality of messages comprise messages specifying a user lifecycle phase that is the same as the current user lifecycle phase for the user.

Clause 3. The computer-implemented method of any of clauses 1-2, wherein the selected messages are selected from the plurality of messages based, at least in part, upon one or more attributes associated with the user.

Clause 4. The computer-implemented method of any of clauses 1-3, wherein the messages are selected from the plurality of messages further using one or more governance rules.

Clause 5. The computer-implemented method of any of clauses 1-4, wherein the messages are selected from the plurality of messages further based upon a previous interaction by the user with the application.

Clause 6. The computer-implemented method of any of clauses 1-5, wherein the previous interaction comprises an interaction by the user with the application prior to viewing a message, while viewing a message, or after viewing a message.

Clause 7. The computer-implemented method of any of clauses 1-6, wherein the desired outcome for the current user lifecycle phase comprises the user using a network storage service to store files created with or accessible by an application configured to present the selected messages.

Clause 8. The computer-implemented method of any of clauses 1-7, wherein the desired outcome for the current user lifecycle phase comprises the user renewing a subscription for the application.

9. The computer-implemented method of any of clauses 1-8, wherein the application presents the selected messages in an in-application programmable messaging surface.

Clause 10. The computer-implemented method of any of clauses 1-9, wherein the selected messages comprise content directing a user to a particular feature of the application.

Clause 11. A computer-readable storage medium having computer-executable instructions stored thereupon which, when executed by a processor, cause the processor to: identify a current user lifecycle phase of a user lifecycle model for a user; identify a desired outcome for the user for the current user lifecycle phase; identify a plurality of messages eligible to be shown to the user based upon the current user lifecycle phase for the user, the plurality of messages comprising messages specifying a user lifecycle phase that is the same as the current user lifecycle phase for the user; select messages from the plurality of messages eligible to be shown to the user using one or more governance rules and based on a likelihood that presentation of the messages will advance the desired outcome for the current user lifecycle phase for the user; and cause an application to present the selected messages to the user in an in-application programmable messaging surface.

Clause 12. The computer-readable storage medium of clause 11, wherein the selected messages are selected from the plurality of messages based, at least in part, upon one or more attributes associated with the user or a previous interaction by the user with the application.

Clause 13. The computer-readable storage medium of any of clauses 11-12, wherein the desired outcome for the current user lifecycle phase comprises the user using a network storage service to store files created with or accessible by an application configured to present the selected messages.

Clause 14. The computer-readable storage medium of any of clauses 11-13, wherein the desired outcome for the current user lifecycle phase comprises the user renewing a subscription for the application.

Clause 15. A computing device, comprising: a processor; and a memory storing instructions executable by the processor to: identify a current user lifecycle phase of a user lifecycle model for a user; identify a desired outcome for the user for the current user lifecycle phase; identify a plurality of messages eligible to be shown to the user based upon the current user lifecycle phase for the user, the plurality of messages comprising messages specifying a user lifecycle phase that is the same as the current user lifecycle phase for the user; select messages from the plurality of messages eligible to be shown to the user using one or more governance rules and based on a likelihood that presentation of the messages will advance the desired outcome for the current user lifecycle phase for the user; and cause an application to present the selected messages to the user in an in-application programmable messaging surface.

Clause 16. The computing device of clause 15, wherein the selected messages are selected from the plurality of messages based, at least in part, upon one or more attributes associated with the user or a previous interaction by the user with the application.

Clause 17. The computing device of any of clauses 15-16, wherein the previous interaction comprises an interaction by the user with the application prior to viewing a message, while viewing a message, or after viewing a message.

Clause 18. The computing device of any of clauses 15-17, wherein the desired outcome for the current user lifecycle phase comprises the user using a network storage service to store files created with or accessible by an application configured to present the selected messages.

Clause 19. The computing device of any of clauses 15-18, wherein the desired outcome for the current user lifecycle phase comprises the user renewing a subscription for the application.

Clause 20. The computing device of any of clauses 15-19, wherein the selected messages comprise content directing a user to a particular feature of the application.

Based on the foregoing, it should be appreciated that technologies for orchestrated presentation of messages based upon a desired outcome for a user lifecycle phase have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   identifying a current user lifecycle phase of a user lifecycle model for a user;
   identifying a desired outcome for the user for the current user lifecycle phase;
   identifying a plurality of messages eligible to be shown to the user based upon the current user lifecycle phase for the user;
   determining, by one or more processors, a first match between a per-message lifecycle phase identified in the plurality of messages and the current user lifecycle phase and a second match between a per-message desired outcome definition identified in the plurality of messages and the desired outcome for the user, wherein the per-message desired outcome definition identified in the plurality of messages is learned over time and the determining reduces a number of messages that do not advance the desired outcome for the user;
   selecting, based at least in part on the first match and the second match, one or more messages from the plurality of messages eligible to be shown to the user based on a likelihood that presentation of the one or more messages will advance the desired outcome for the user for the current user lifecycle phase; and
   causing an application to display the selected one or more messages to the user.

2. The computer-implemented method of claim 1, wherein the plurality of messages comprise messages specify a user lifecycle phase that is the same as the current user lifecycle phase for the user.

3. The computer-implemented method of claim 1, wherein the one or more messages are further selected from the plurality of messages based, at least in part, upon one or more attributes associated with the user.

4. The computer-implemented method of claim 1, wherein the one or more messages are further selected from the plurality of messages using one or more governance rules.

5. The computer-implemented method of claim 4, wherein the one or more governance rules define a time period during which a message is displayed and the message indicates an event within the time period.

6. The computer-implemented method of claim 4, wherein the one or more governance rules are updated based on user activity data defining user action taken in response to receiving a message.

7. The computer-implemented method of claim 1, wherein the one or more messages are further selected from the plurality of messages further based upon a previous interaction by the user with the application.

8. The computer-implemented method of claim 7, wherein the previous interaction comprises an interaction by the user with the application prior to viewing a message, while viewing a message, or after viewing a message.

9. The computer-implemented method of claim 1, wherein the application presents the selected one or more messages in an in-application programmable messaging surface.

10. The computer-implemented method of claim 9, wherein the selected one or more messages comprise content directing a user to a particular feature of the application.

11. The computer-implemented method of claim 1, wherein the one or more messages are selected from the plurality of messages eligible to be shown to the user based upon user attributes comprising data defining a user interest, user activity in the application, and user activity in one or more previous versions of the application.

12. The method of claim 1, further comprising
   causing the application to display the selected one or more messages in a first order;

determining that displaying the selected one or more messages in the first order did not result in the desired outcome for the user for the current user lifecycle phase; and causing the application to display the selected one or more messages in a second order to determine a personalized model for the user.

13. A computer-readable storage medium having computer-executable instructions stored thereupon which, when executed by a processor, cause the processor to:

identify a current user lifecycle phase of a user lifecycle model for a user;

identify a desired outcome for the user for the current user lifecycle phase;

identify a plurality of messages eligible to be shown to the user based upon the current user lifecycle phase for the user;

determine a first match between a per-message lifecycle phase identified in the plurality of messages and the current user lifecycle phase and a second match between a per-message desired outcome definition identified in the plurality of messages and the desired outcome for the user, wherein the per-message desired outcome definition identified in the plurality of messages is learned over time and the determining reduces a number of messages that do not advance the desired outcome for the user;

select, based at least in part on the first match and the second match, one or more messages from the plurality of messages eligible to be shown to the user using one or more governance rules and based on a likelihood that presentation of the one or more messages will advance the desired outcome for the user for the current user lifecycle phase; and cause an application to display the selected one or more messages to the user in an in-application programmable messaging surface.

14. The computer-readable storage medium of claim 13, wherein the one or more messages are further selected from the plurality of messages based, at least in part, upon one or more attributes associated with the user or a previous interaction by the user with the application.

15. The computer-readable storage medium of claim 13, wherein the desired outcome for the user for the current user lifecycle phase comprises the user using a network storage service to store files created with or accessible by the application.

16. The computer-readable storage medium of claim 13, wherein the desired outcome for the user for the current user lifecycle phase comprises the user renewing a subscription for the application.

17. A computing device, comprising:

a processor; and a memory storing instructions executable by the processor to:

identify a current user lifecycle phase of a user lifecycle model for a user;

identify a desired outcome for the user for the current user lifecycle phase;

identify a plurality of messages eligible to be shown to the user based upon the current user lifecycle phase for the user;

determine a first match between a per-message lifecycle phase identified in the plurality of messages and the current user lifecycle phase and a second match between a per-message desired outcome definition identified in the plurality of messages and the desired outcome for the user, wherein the per-message desired outcome definition identified in the plurality of messages is learned over time and the determining reduces a number of messages that do not advance the desired outcome for the user;

select, based at least in part on the first match and the second match, one or more messages from the plurality of messages eligible to be shown to the user using one or more governance rules and based on a likelihood that presentation of the one or more messages will advance the desired outcome for the user for the current user lifecycle phase; and cause an application to display the selected one or more messages to the user in an in-application programmable messaging surface.

18. The computing device of claim 17, wherein the one or more messages are further selected from the plurality of messages based, at least in part, upon one or more attributes associated with the user or a previous interaction by the user with the application.

19. The computing device of claim 18, wherein the previous interaction comprises an interaction by the user with the application prior to viewing a message, while viewing a message, or after viewing a message.

20. The computing device of claim 17, wherein the selected one or more messages comprise content directing a user to a particular feature of the application.

* * * * *